(12) United States Patent
Iwamoto et al.

(10) Patent No.: US 9,725,125 B2
(45) Date of Patent: Aug. 8, 2017

(54) STRADDLE-TYPE VEHICLE

(71) Applicant: Kawasaki Jukogyo Kabushiki Kaisha, Kobe-shi, Hyogo (JP)

(72) Inventors: Taro Iwamoto, Kakogawa (JP); Mikio Domoto, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 67 days.

(21) Appl. No.: 14/975,425

(22) Filed: Dec. 18, 2015

(65) Prior Publication Data
US 2016/0185409 A1  Jun. 30, 2016

(30) Foreign Application Priority Data

Dec. 24, 2014 (JP) ................. 2014-260954

(51) Int. Cl.
| | |
|---|---|
| *B60Q 1/06* | (2006.01) |
| *B62J 6/02* | (2006.01) |
| *B60Q 1/18* | (2006.01) |
| *B60Q 1/14* | (2006.01) |
| *B60Q 1/12* | (2006.01) |
| *B60Q 1/00* | (2006.01) |

(52) U.S. Cl.
CPC .............. *B62J 6/02* (2013.01); *B60Q 1/0041* (2013.01); *B60Q 1/12* (2013.01); *B60Q 1/1423* (2013.01); *B60Q 1/18* (2013.01); *B60Q 1/0035* (2013.01); *B60Q 2300/136* (2013.01)

(58) Field of Classification Search
CPC ..... B62J 6/02; B60Q 1/00; B60Q 1/18; B60Q 1/1423; B60Q 1/12; B60Q 1/0035; B60Q 23/136
See application file for complete search history.

(56) References Cited

U.S. PATENT DOCUMENTS 6,031,452 A * 2/2000 Trbovich ................. B60Q 1/44
307/10.8

FOREIGN PATENT DOCUMENTS

| EP | 2657076 | * 10/2013 | ................ B62J 6/02 |
|---|---|---|---|
| EP | 2657076 A1 | 10/2013 | |
| JP | 2013248988 A | 12/2013 | |

OTHER PUBLICATIONS

European Patent Office, Extended European Search Report Issued in Application No. 15201453.6, May 2, 2016, Germany, 8 pages.

\* cited by examiner

*Primary Examiner* — Ali Alavi
(74) *Attorney, Agent, or Firm* — Alleman Hall Creasman & Tuttle LLP

(57) ABSTRACT

A straddle-type vehicle which turns while a vehicle body is banked to a first side in a vehicle width direction around a predetermined angular displacement center, comprises a head lamp which irradiates a head lamp irradiation region set to be forward relative to the vehicle body; a first auxiliary lamp which irradiates a first auxiliary lamp irradiation region set to be forward relative to the head lamp irradiation region, in a region which is inward with respect to a turning direction; and a second auxiliary lamp which irradiates a second auxiliary lamp irradiation region set to be forward relative to the first auxiliary lamp irradiation region, in the region which is inward with respect to the turning direction, wherein a distance between the second auxiliary lamp and the angular displacement center is less than a distance between the first auxiliary lamp and the angular displacement center.

8 Claims, 7 Drawing Sheets

STRADDLE-TYPE VEHICLE

CROSS-REFERENCE TO THE RELATED APPLICATION

This application claims priority to and the benefit of Japanese Patent Application No. 2014-260954, filed on Dec. 24, 2014, the entire disclosure of which is incorporated herein by reference.

BACKGROUND OF THE INVENTION

Field of the Invention

The present invention relates to a straddle-type vehicle including an auxiliary lamp used to irradiate a region which cannot be irradiated by a head lamp.

Description of the Related Art

When a straddle-type vehicle is driven on a straight road, a region irradiated by a head lamp (region irradiated with light emitted from the head lamp) extends rightward and leftward, in a front region relative to a vehicle body in a travelling direction of the vehicle, and below a horizontal plane. For example, in a case where the straddle-type vehicle turns in a state in which its vehicle body is banked to the left with respect to the travelling direction, the region irradiated by the head lamp is lowered at the left from the perspective of a rider straddling the vehicle body. In other words, the head lamp irradiates a location which is closer to the vehicle body, of a region which is inward with respect to a turning direction in which the vehicle body turns, in the front region relative to the vehicle body. This reduces the irradiation region in a specified range of the region which is inward with respect to the turning direction of the vehicle body. As a solution to this, for example, Japanese Laid-Open Patent Application Publication No. 2013-248988 discloses a conventional straddle-type vehicle including a plurality of auxiliary lamps.

In the above conventional straddle-type vehicle, the auxiliary lamp attached to the vehicle body in a higher position is turned on when the degree of the bank angle of the vehicle body increases. A distance from the auxiliary lamp attached to the vehicle body in the higher position to a roll center is greater than that from another auxiliary lamp attached to the vehicle body in a lower position to the roll center. Also, the movement range of the auxiliary lamp attached to the vehicle body in the higher position is greater than that of another auxiliary lamp attached to the vehicle body in the lower position.

In a case where the vehicle body of the above conventional straddle-type vehicle is further banked after the auxiliary lamp placed in a highest position is turned on, the movement range of this auxiliary lamp in a vertical direction increases. For this reason, the region irradiated by this auxiliary lamp is significantly shifted to be close to the vehicle body, in the region which is inward with respect to the turning direction of the vehicle body. As a result, an irradiation region in a specified range of the region which is inward with respect to the turning direction of the vehicle body significantly decreases.

SUMMARY OF THE INVENTION

An object of the present invention is to provide a straddle-type vehicle which can lessen a decrease in an irradiation region in a specified range of a region which is inward with respect to a turning direction in which a vehicle body turns, in a front region relative to the vehicle body in a travelling direction, even when the degree of the bank angle of the vehicle body increases.

To achieve the above-described object, according to an aspect of the present invention, a straddle-type vehicle which turns in a state in which a vehicle body is banked from an upright state to a first side in a vehicle width direction around a predetermined angular displacement center, comprises a head lamp which irradiates a head lamp irradiation region set to be forward in a travelling direction of the vehicle, relative to the vehicle body; a first auxiliary lamp which irradiates a first auxiliary lamp irradiation region set to be forward in the travelling direction of the vehicle, relative to the head lamp irradiation region, in a region which is inward with respect to a turning direction in which the vehicle body turns; and a second auxiliary lamp which irradiates a second auxiliary lamp irradiation region set to be forward in the travelling direction of the vehicle, relative to the first auxiliary lamp irradiation region, in the region which is inward with respect to the turning direction of the vehicle body, wherein the second auxiliary lamp is placed in such a manner that a distance between the second auxiliary lamp and the predetermined angular displacement center is less than a distance between the first auxiliary lamp and the predetermined angular displacement center.

In accordance with this configuration, the first auxiliary lamp irradiation region and the second auxiliary lamp irradiation region are set to be forward in the travelling direction of the vehicle, relative to the head lamp irradiation region. Therefore, in the straddle-type vehicle of the present invention, the first auxiliary lamp and the second auxiliary lamp can irradiate the region which cannot be irradiated by the head lamp, in the region which is inward with respect to the turning direction of the vehicle body.

The second auxiliary lamp irradiation region is set to be forward in the travelling direction of the vehicle, relative to the first auxiliary lamp irradiation region. Therefore, when the degree of the bank angle of the vehicle body increases by a predetermined value or greater after the first auxiliary lamp is turned on, the second auxiliary lamp can irradiate the region which cannot be irradiated by the first auxiliary lamp, in the region which is inward with respect to the turning direction of the vehicle body.

The distance between the second auxiliary lamp and the angular displacement center is less than that between the first auxiliary lamp and the angular displacement center. For this reason, the amount of displacement of the second auxiliary lamp which occurs when the vehicle body is banked is less than that of the first auxiliary lamp, and hence the amount of displacement of the second auxiliary lamp irradiation region, which occurs with a change in the degree of the bank angle, is less than that of the first auxiliary lamp irradiation region.

When the degree of the bank angle of the vehicle body increases, the second auxiliary lamp which irradiates the region which is forward in the travelling direction of the vehicle, relative to that of the first auxiliary lamp, irradiates the region which is inward with respect to the turning direction of the vehicle body. This makes it possible to lessen a decrease in the irradiation region in the region which is inward with respect to the turning direction of the vehicle body, the decrease occurring with an increase in the degree of the vehicle body.

Therefore, the straddle-type vehicle of the present invention can effectively lessen a decrease in the irradiation region in a specified range of the region which is inward with respect to the turning direction of the vehicle body, in the front region relative to the vehicle body in the travelling direction of the vehicle, even when the degree of the bank angle increases.

In the above straddle-type vehicle, the auxiliary lamp irradiation region irradiated by at least one of the first auxiliary lamp and the second auxiliary lamp which are placed in positions on the first side in the vehicle width direction may be set in a position on the first side in the vehicle width direction relative to a portion of the head lamp irradiation region, the portion corresponding to a center position of the vehicle body in the vehicle width direction.

In accordance with this configuration, in a case where the straddle-type vehicle turns in a state in which the vehicle body is banked to the first side in the vehicle width direction, the front region relative to the vehicle body can be irradiated by the auxiliary lamp placed on the first side, the auxiliary lamp irradiation region of the auxiliary lamp being set in the position on the first side in the vehicle width direction relative to the portion of the head lamp irradiation region, the portion corresponding to the center position of the vehicle body in the vehicle width direction. Therefore, the region which is inward with respect to the turning direction of the vehicle body can be irradiated by the auxiliary lamp located to be closer to this region.

In the above straddle-type vehicle, each of the first auxiliary lamp and the second auxiliary lamp may include a light emitting diode light source.

In accordance with this configuration, the size of each of the auxiliary lamps can be reduced.

In the above straddle-type vehicle, one of the first auxiliary lamp and the second auxiliary lamp, which is located on a lower side, may be placed to be lower than a center position of the head lamp.

In accordance with this configuration, the distance between the auxiliary lamp and the angular displacement center can be easily reduced.

In the above straddle-type vehicle, at least one of the first auxiliary lamp and the second auxiliary lamp may be configured to adjust a light amount thereof, and the one of the first auxiliary lamp and the second auxiliary lamp may be configured to adjust the light amount in such a manner that the light amount is greater after a bank angle of the vehicle body has reached a predetermined degree than before the bank angle reaches the predetermined degree.

In accordance with this configuration, after the bank angle of the vehicle body has reached the predetermined degree, the auxiliary lamp configured to adjust the light amount can increase the light amount. Therefore, after the bank angle of the vehicle body has reached the predetermined degree, the auxiliary lamp configured to adjust the light amount can function as the auxiliary lamp which irradiates the region which cannot be irradiated by the head lamp. On the other hand, before the bank angle reaches the predetermined degree, the auxiliary lamp configured to adjust the light amount can emit a small amount of light, and function as a position lamp.

In the above straddle-type vehicle, the first auxiliary lamp and the second auxiliary lamp may be placed in positions on a second side in the vehicle width direction, relative to a center position of the vehicle body in the vehicle width direction, the first auxiliary lamp irradiation region and the second auxiliary lamp irradiation region may be set to be forward in the travelling direction of the vehicle, relative to the head lamp irradiation region and are set in positions on the first side in the vehicle width direction relative to a portion of the head lamp irradiation region, the portion corresponding to the center position of the vehicle body in the vehicle width direction, and the straddle-type vehicle may further comprise a prior irradiation auxiliary lamp which is turned on and irradiates a region which is forward in the travelling direction of the vehicle, relative to the head lamp irradiation region, before the first auxiliary lamp and the second auxiliary lamp are turned on, during turning of the vehicle body, wherein the prior irradiation auxiliary lamp may be placed in a position on the first side in the vehicle width direction relative to a center position of the vehicle body in the vehicle width direction, and wherein the auxiliary lamp irradiation region of the prior irradiation auxiliary lamp may be set to be rearward in the travelling direction of the vehicle, relative to the first auxiliary lamp irradiation region and the second auxiliary lamp irradiation region, in the region which is inward with respect to the turning direction of the vehicle body.

In accordance with this configuration, in an initial stage at which the vehicle body is banked to the first side in the vehicle width direction, the prior irradiation auxiliary lamp placed on the first side irradiates the region which is inward with respect to the turning direction of the vehicle body. In this way, the road surface of the front region, which is close to the vehicle body, can be easily irradiated. When the degree of the bank angle of the vehicle body increases, the first auxiliary lamp and the second auxiliary lamp placed on the second side in the vehicle width direction irradiate the region which is inward with respect to the turning direction of the vehicle body. Thus, the road surface can be irradiated from positions higher than that of the prior irradiation auxiliary lamp. In this way, the road surface of the front region, which is distant from the vehicle body, can be easily irradiated.

In the above straddle-type vehicle, the first auxiliary lamp and the second auxiliary lamp may be placed in positions on the first side in the vehicle width direction, relative to a center position of the vehicle body in the vehicle width direction, and the first auxiliary lamp irradiation region and the second auxiliary lamp irradiation region may be set to be forward in the travelling direction of the vehicle, relative to the head lamp irradiation region and are set in positions on the first side in the vehicle width direction relative to a portion of the head lamp irradiation region, the portion corresponding to the center position of the vehicle body in the vehicle width direction, and the straddle-type vehicle may further comprise: a subsequent irradiation auxiliary lamp which is turned on and irradiates a region which is forward in the travelling direction of the vehicle, relative to the head lamp irradiation region, after the first auxiliary lamp and the second auxiliary lamp are turned on, during turning of the vehicle body, wherein the subsequent irradiation auxiliary lamp may be placed in a position on a second side in the vehicle width direction relative to a center position of the vehicle body in the vehicle width direction, and wherein the auxiliary lamp irradiation region of the subsequent irradiation auxiliary lamp may be set to be forward in the travelling direction of the vehicle, relative to the first auxiliary lamp irradiation region and the second auxiliary lamp irradiation region, in the region which is inward with respect to the turning direction of the vehicle body.

In accordance with this configuration, in an initial stage at which the vehicle body is banked to the first side in the vehicle width direction, the first auxiliary lamp or the second auxiliary lamp placed on the first side irradiates the region which is inward with respect to the turning direction of the vehicle body. In this way, the road surface of the front region, which is close to the vehicle body, can be easily irradiated. When the degree of the bank angle of the vehicle body increases, the subsequent irradiation auxiliary lamp placed on the second side in the vehicle width direction irradiates the region which is inward with respect to the turning direction of the vehicle body. Thus, the road surface can be irradiated from a position higher than that of the first or second auxiliary lamp. In this way, the road surface of the front region, which is distant from the vehicle body, can be easily irradiated.

To achieve the above-described object, according to another aspect of the present invention, a straddle-type vehicle which turns in a state in which a vehicle body is banked from an upright state to a first side in a vehicle width direction around a predetermined angular displacement center, comprises a head lamp which irradiates a head lamp irradiation region set to be forward in the travelling direction of the vehicle, relative to the vehicle body; an inner auxiliary lamp which irradiates an inner auxiliary lamp irradiation region in a region which is inward with respect to a turning direction in which the vehicle body turns, the inner auxiliary lamp irradiation region being set in a position on the first side in the vehicle width direction relative to a portion of the head lamp irradiation region, the portion corresponding to a center position of the vehicle body in the vehicle width direction, the inner auxiliary lamp irradiation region being set to be forward in the travelling direction of the vehicle, relative to the head lamp irradiation region, the inner auxiliary lamp being placed in a position on the first side in the vehicle width direction relative to the center position of the vehicle body in the vehicle width direction; and an outer auxiliary lamp which irradiates an outer auxiliary lamp irradiation region set to be forward in the travelling direction of the vehicle, relative to the inner auxiliary lamp irradiation region, in the region which is inward with respect to the turning direction of the vehicle body, the outer auxiliary lamp being placed in a position on a second side in the vehicle width direction relative to the center position of the vehicle body in the vehicle width direction.

In accordance with this configuration, in an initial stage at which the vehicle body is banked to the first side in the vehicle width direction, the inner auxiliary lamp placed on the first side irradiates the region which is inward with respect to the turning direction of the vehicle body. In this way, the road surface of the front region, which is close to the vehicle body, can be easily irradiated. When the degree of the bank angle of the vehicle body increases, the outer auxiliary lamp placed on the second side in the vehicle width direction irradiates the region which is inward with respect to the turning direction of the vehicle body. Thus, the road surface can be irradiated from a position higher than that of the inner auxiliary lamp. In this way, the road surface of the front region, which is distant from the vehicle body, can be easily irradiated.

As described above, the straddle-type vehicle of the present invention can effectively lessen a decrease in an irradiation region in a specified range of a region which is inward with respect to the turning direction of the vehicle body, in a front region relative to the vehicle body, even when the degree of bank angle of the vehicle body increases.

The above and further objects, features, and advantages of the present invention will more fully be apparent from the following detailed description of preferred embodiment with accompanying drawings.

DETAILED DESCRIPTION OF THE EMBODIMENTS

Embodiment 1

Now, Embodiment 1 of the present invention will be described regarding a motorcycle 1 which is an exemplary straddle-type vehicle with reference to the accompanying drawings. The straddle-type vehicle which turns in a state in which its vehicle body is banked from its upright state to one side (hereinafter will be referred to as a first side) in a vehicle width direction is not limited to the motorcycle 1. For example, the straddle-type vehicle may be a three-wheeled motor vehicle, a snow mobile, an all-terrain vehicle (ATV), etc. Hereinafter, throughout the drawings, the same or corresponding components are designated by the same reference symbols, and will not be described repeatedly. The stated directions are from the perspective of a rider straddling the motorcycle 1. A vehicle width direction of the vehicle body corresponds with a rightward and leftward direction.

Configuration of Motorcycle

Figure 1:
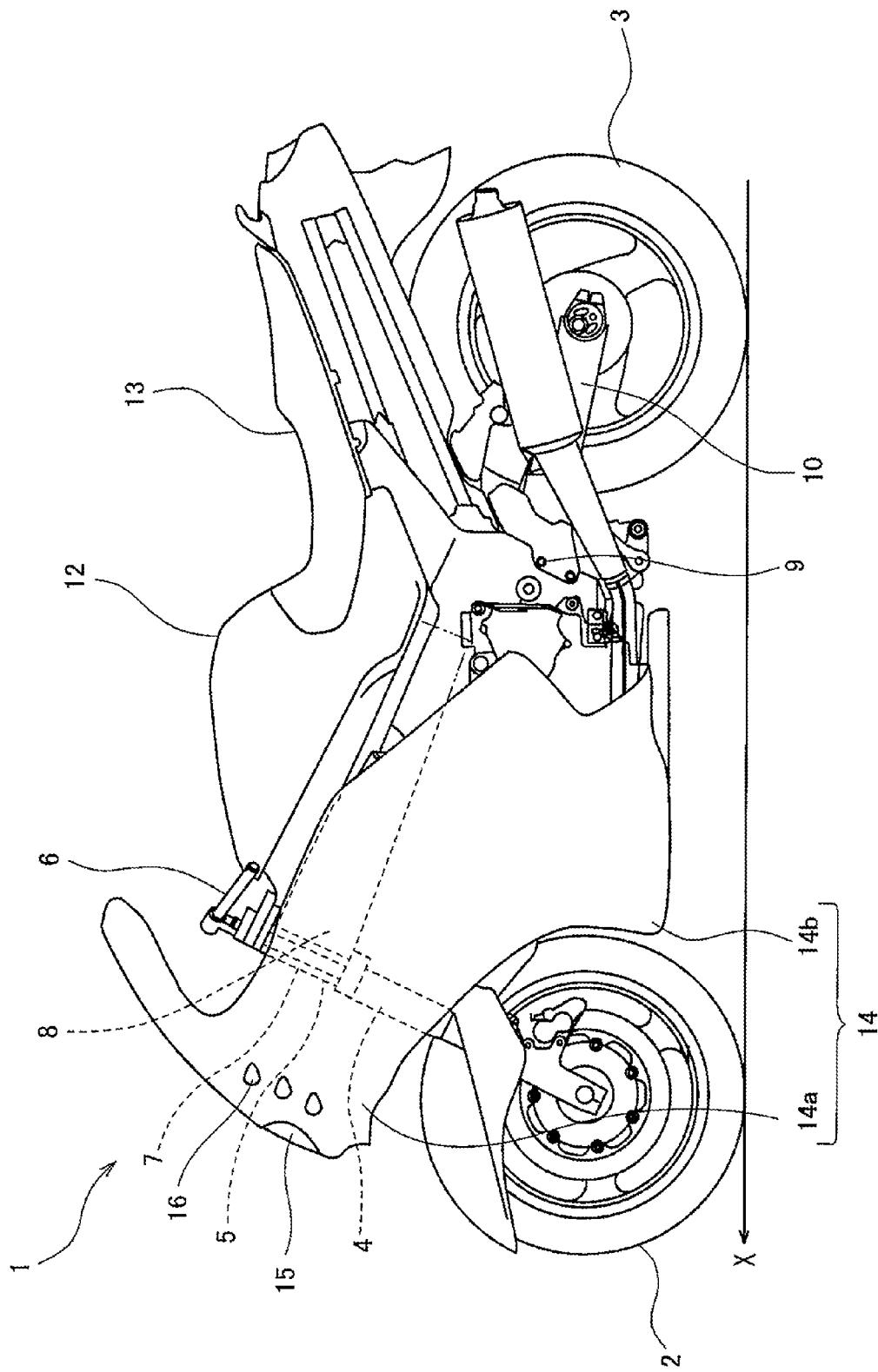
FIG. 1 is a left side view of a motorcycle according to Embodiment 1 of the present invention.

FIG. 1 is a left side view of the motorcycle 1 according to Embodiment 1 of the present invention. As shown in FIG. 1, the motorcycle 1 includes a front wheel 2 and a rear wheel 3. The front wheel 2 is rotatably mounted to the lower portion of a front fork 4 extending substantially vertically. A steering handle 6 extending in the vehicle width direction is attached to the upper portion of the front fork 4 via a steering shaft 5. The steering shaft 5 is rotatably supported by a head pipe 7 constituting a portion of a vehicle body frame. A pair of right and left main frames (vehicle body frame) 8 extend rearward from the head pipe 7. A pair of pivot frames 9 extend downward from the rear portions of the main frames 8, respectively. The front end portion of a swing arm 10 is attached to the pivot frames 9 such that the swing arm 10 is vertically pivotable. The rear wheel 3 is rotatably mounted to the rear end portion of the swing arm 10.

A fuel tank 12 is placed above the main frames 8. A rider straddle seat 13 is placed behind the fuel tank 12.

The vehicle body of the motorcycle 1 is covered by a cowling 14 including a front cover 14a and a side cover 14b. A head lamp 15 is attached to the front cover 14a of the cowling 14. A plurality of auxiliary lamps 16 are attached to the front cover 14a and placed laterally relative to the head lamp 15. The head lamp 15 may be a head lamp of a projector type including a light emitting diode (LED) as a light source. By use of the head lamp of the projector type, the size of the head lamp 15 can be reduced, and the plurality of auxiliary lamps 16 can be laid out more flexibly in the vicinity of the head lamp 15.

In Embodiment 1, the light source of each of the plurality of auxiliary lamps 16 is the LED light source. By use of the LED light source, the size of each of the plurality of auxiliary lamps 16 can be reduced, as compared to a case where for example, a halogen bulb or a discharge lamp is used as the light source. Therefore, the plurality of auxiliary lamps 16 including the LED light sources can be laid out easily.

Figure 2:
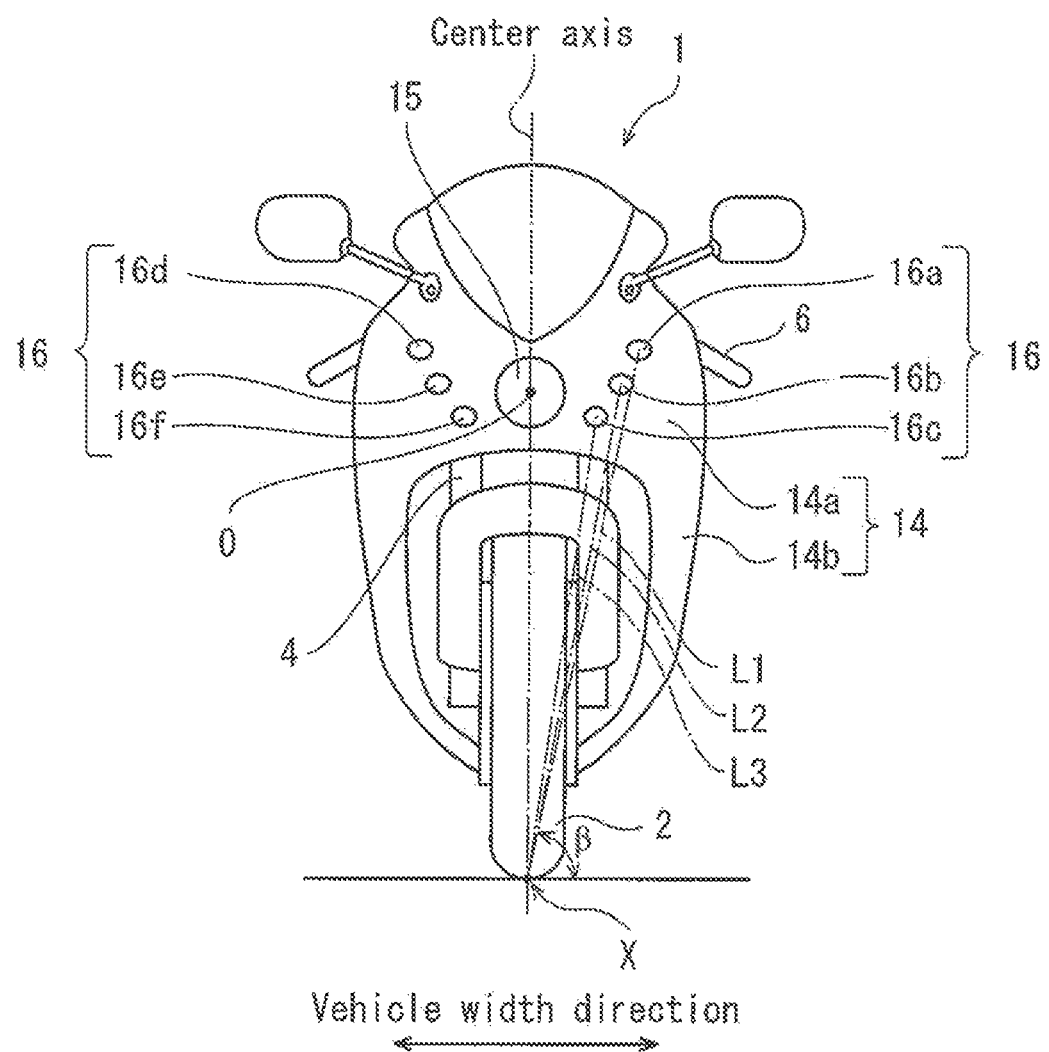
FIG. 2 is a front view of the motorcycle according to Embodiment 1 of the present invention.

FIG. 2 is a front view of the motorcycle 1 according to Embodiment 1 of the present invention. As shown in FIG. 2, in the motorcycle 1 according to Embodiment 1, the head lamp 15 is attached to the front cover 14a in a center position of the vehicle body in the vehicle width direction (position through which a center axis in a vertical direction passes).

The plurality of auxiliary lamps 16 include an upper auxiliary lamp 16a, an intermediate auxiliary lamp 16b, and a lower auxiliary lamp 16c, which are placed in positions on the first side relative to the center position of the vehicle body in the vehicle width direction. The plurality of auxiliary lamps 16 further include an upper auxiliary lamp 16d, an intermediate auxiliary lamp 16e, and a lower auxiliary lamp 16f, which are placed in positions on the other side (hereinafter will be referred to as a second side) in the vehicle width direction, relative to the center position of the vehicle body in the vehicle width direction. In a case where the upper auxiliary lamp 16a, the intermediate auxiliary lamp 16b, the lower auxiliary lamp 16c, the upper auxiliary lamp 16d, the intermediate auxiliary lamp 16e, and the lower auxiliary lamp 16f need not be distinguished from each other, they will be collectively referred to as the auxiliary lamp(s) 16. In Embodiment 1, the side to which the vehicle body of the motorcycle 1 is banked will be referred to as the "first side," while an opposite side thereof will be referred to as the "second side."

Although not shown in FIGS. 1 and 2, the light source of the head lamp 15 includes a high beam light source and a low beam light source. The high beam light source irradiates a region extending in a horizontal direction or a region located above the region extending in the horizontal direction, in a front region relative to the vehicle body. The low beam light source irradiates a region below the region extending in the horizontal direction, in the front region relative to the vehicle body. The head lamp 15 irradiates the front region by use of the high beam light source during driving of the motorcycle 1. The head lamp 15 irradiates the front region by use of the low beam light source when the motorcycle 1 goes by another vehicle on the road. The rider operates, for example, an operation switch (not shown) attached to the steering handle 6, to select the high beam light source or the low beam light source. In this way, the region to be irradiated by the head lamp 15 can be selected from the two regions. However, for easier understanding of the description, a head lamp irradiation region 20 (see FIG. 3 described later) will hereinafter indicate the region irradiated with the light emitted from the low beam light source.

An auxiliary lamp irradiation region 21 (see FIG. 3 described later) which is a region irradiated by the auxiliary lamp 16 is set to be forward in the travelling direction of the vehicle, relative to the head lamp irradiation region 20 of the head lamp 15. The auxiliary lamp irradiation region 21 of the auxiliary lamp 16 placed on the first side in the vehicle width direction is set to a region in a position on the first side in the vehicle width direction, relative to a portion of the head lamp irradiation region 20, the portion corresponding to the center position of the vehicle body in the vehicle width direction. Likewise, the auxiliary lamp irradiation region 21 of the auxiliary lamp 16 placed on the second side in the vehicle width direction is set to a region in a position on the second side in the vehicle width direction, relative to the portion of the head lamp irradiation region 20, the portion corresponding to the center position of the vehicle body in the vehicle width direction.

A select switch used to select or not select an auxiliary irradiation mode in which the auxiliary lamp 16 is turned on may be attached to, for example, the steering handle 6, and the rider may operate the select switch to select or not select the auxiliary irradiation mode. In a case where the auxiliary irradiation mode is not selected, the auxiliary lamp 16 cannot be turned on even in a state in which the vehicle body is banked.

As described above, the auxiliary lamp irradiation region 21 of the auxiliary lamp 16 is set to be forward in the travelling direction of the vehicle, relative to the head lamp irradiation region 20. To prevent a situation in which a person riding in a vehicle coming from the opposite direction or a vehicle driving ahead of the motorcycle 1 is bothered by a glaring light, the timings at which the auxiliary lamps 16 are turned on are determined, instead of turning on the auxiliary lamps 16 all the time. Specifically, in the motorcycle 1 according to Embodiment 1, the order in which the auxiliary lamps 16 are turned on is determined according to the degree of the bank angle of the vehicle body, as will be described later.

More specifically, as shown in FIG. 2, on the first side in the vehicle width direction, the upper auxiliary lamp 16a, the intermediate auxiliary lamp 16b, and the lower auxiliary lamp 16c, are placed in this order, from an upper side, in the height direction of the motorcycle 1. On the first side in the vehicle width direction, the upper auxiliary lamp 16a, the intermediate auxiliary lamp 16b, and the lower auxiliary lamp 16c are arranged along a line extending downward from an upper side toward the center in the vehicle width direction. The term "the height direction of the motorcycle 1" is defined as a direction indicating the overall height of the motorcycle 1 and is a vertical direction in a state in which the motorcycle 1 is upright.

As shown in FIG. 2, at least the lower auxiliary lamp 16c placed in a lowermost position, among the upper auxiliary lamp 16a, the intermediate auxiliary lamp 16b, and the lower auxiliary lamp 16c, is located to be lower than the center position O of the head lamp 15. In this layout, a distance between the lower auxiliary lamp 16c and an angular displacement center X can be reduced.

In the present embodiment, the angular displacement center X can be set to a ground point at which the wheel is grounded on the road surface. For example, the angular displacement center X is set to an intersection point at which an axis extending in the forward and rearward direction and passing through an intersection point (apex of the bank angle) at which a straight line connecting the ground point to the center of the vehicle body intersects with the road surface, and a virtual plane passing through the auxiliary lamp 16 and being perpendicular to the forward and rearward direction, intersect each other.

Alternatively, the angular displacement center X may be set to an intersection point at which the virtual plane passing through the auxiliary lamp 16 and being perpendicular to the forward and rearward direction, and the roll axis of the motorcycle 1 intersect each other. In the present embodiment, for example, the roll axis can be defined as an axis connecting the head pipe 7 to the ground surface on which the rear wheel 3 is grounded. Further, the angular displacement center X may be set to an intersection point at which the virtual plane passing through the auxiliary lamp 16 and being perpendicular to the forward and rearward direction, and an axis passing through the center of gravity of the vehicle body and extending in the forward and rearward direction intersect each other.

The upper auxiliary lamp 16a placed on an upper side may be located above the center position O of the head lamp 15, preferably above the head lamp 15. In this layout, the upper auxiliary lamp 16a may be located rearward in the travelling direction, relative to the head lamp 15, inside of the front cover 14a.

On the second side in the vehicle width direction, the upper auxiliary lamp 16d, the intermediate auxiliary lamp 16e, and the lower auxiliary lamp 16f are placed to be symmetric with the upper auxiliary lamp 16a, the intermediate auxiliary lamp 16b, and the lower auxiliary lamp 16c in the above layout, respectively, relative to a center axis in the vehicle width direction. In other words, in the motorcycle 1 according to Embodiment 1, the auxiliary lamps 16 placed on the first side in the vehicle width direction and the auxiliary lamps 16 placed on the second side in the vehicle width direction define a substantially-V shape. The number of the auxiliary lamps 16 is not limited to six and may be set as desired.

Figure 3:
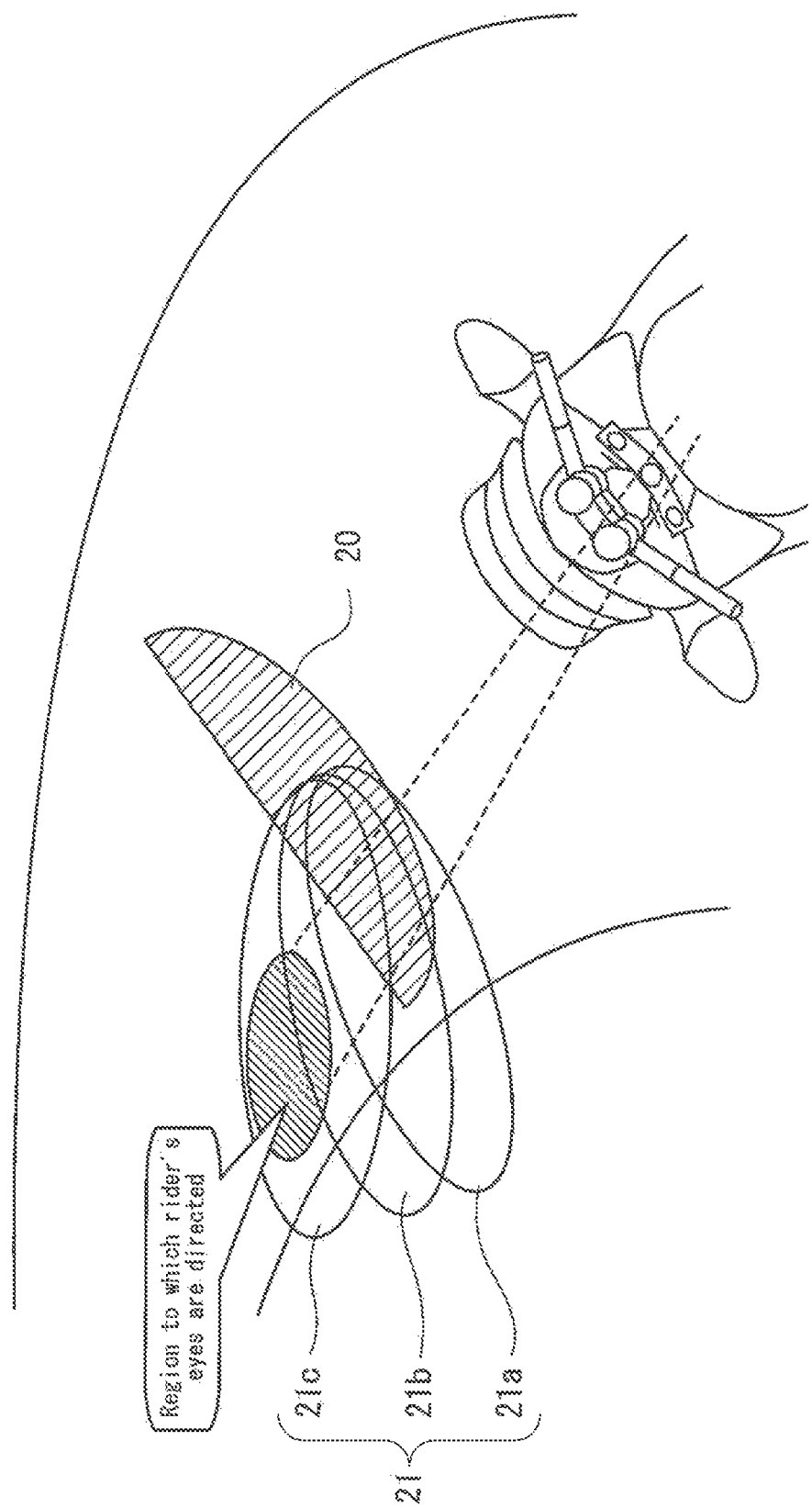
FIG. 3 is a view schematically showing an exemplary relationship between an irradiation region irradiated by a head lamp and irradiation regions irradiated by auxiliary lamps, in the motorcycle according to Embodiment 1 of the present invention.

In the motorcycle 1 according to Embodiment 1, the auxiliary lamps 16 placed on the first side in the vehicle width direction are turned on in the order of the upper auxiliary lamp 16a located on an upper side, the intermediate auxiliary lamp 16b, and the lower auxiliary lamp 16c located on a lower side. FIG. 3 is a view schematically showing an exemplary relationship between the region (head lamp irradiation region 20) irradiated by the head lamp 15 and the regions (auxiliary lamp irradiation regions 21) irradiated by the auxiliary lamps 16, in the motorcycle 1 according to Embodiment 1 of the present invention. As shown in FIG. 3, the auxiliary lamp irradiation regions 21 are set in such a manner that an auxiliary lamp irradiation region 21b is located forward in the travelling direction of the vehicle, relative to an auxiliary lamp irradiation region 21a and an auxiliary lamp irradiation region 21c is located forward in the travelling direction, relative to the auxiliary lamp irradiation region 21b, in the region which is inward with respect to the turning direction of the vehicle body.

The timings at which the auxiliary lamps 16 are turned on are determined depending on the degree of the bank angle indicating the bank state of the vehicle body of the motorcycle 1. More specifically, the auxiliary lamp 16 placed on the first side (the side to which the vehicle body is banked) in the vehicle width direction and on a lower side is turned on as the degree of the bank angle increases. For example, the upper auxiliary lamp 16a is turned on when the bank angle is equal to or less than 10 degrees, the intermediate auxiliary lamp 16b is turned on when the bank angle is greater than 10 degrees and is equal to or less than 20 degrees, and the lower auxiliary lamp 16c is turned on when the bank angle is greater than 20 degrees and is equal to or less than 30 degrees.

To realize the above-described configuration, the motorcycle 1 includes a bank angle estimating unit (not shown) for estimating the degree of the bank angle of the vehicle body, and a turn-on control unit (not shown) for controlling the turn-on of the auxiliary lamp 16 based on the degree of the bank angle estimated by the bank angle estimating unit, and is able to turn on the auxiliary lamps 16 placed on the first side in the vehicle width direction, depending on the degree of the bank angle. As the bank angle estimating unit for estimating the degree of the bank angle, a gyro sensor, a tilting sensor, an inertia sensor, etc., may be used.

When the auxiliary irradiation mode is selected by the rider, the turn-on control unit selects the auxiliary lamp 16 to be turned on according to the degree of the bank angle. If the auxiliary irradiation mode is selected by the rider, with the motorcycle 1 being in a stopped state, the auxiliary irradiation mode may not be activated and the auxiliary lamp 16 may remain in an off-state, even in a state in which the vehicle body of the motorcycle 1 is banked. It may be determined whether or not the motorcycle 1 is in the stopped state, based on the position of a side stand, a vehicle speed, an engine speed, a gear position (e.g., whether or not the gear position is a neutral position), etc., of the motorcycle 1, which are detected by sensors. This makes it possible to prevent a situation in which the auxiliary lamp 16 is turned on unintentionally, for example, in a case where the motorcycle 1 is in the stopped state with the vehicle body standing by itself by use of the side stand.

As described above, the auxiliary lamp irradiation region 21 of the auxiliary lamp 16 is set to be forward in the travelling direction, relative to the head lamp irradiation region 20 of the head lamp 15. The auxiliary lamp 16 irradiates the region which is inward with respect to the turning direction of the vehicle body, to irradiate a region which cannot be irradiated by the head lamp 15 (a region which the light emitted from the head lamp 15 cannot reach).

The auxiliary lamp irradiation region 21 of the auxiliary lamp 16 placed on a lower side, of the two auxiliary lamps 16 arranged vertically on the first side in the vehicle width direction, is set to be forward in the travelling direction, relative to the auxiliary lamp irradiation region 21 of the auxiliary lamp 16 placed on an upper side. More specifically, in the region which is inward with respect to the turning direction of the vehicle body, the auxiliary lamp irradiation region 21b of the intermediate auxiliary lamp 16b is set to be forward in the travelling direction, relative to the auxiliary lamp irradiation region 21a of the upper auxiliary lamp 16a, and the auxiliary lamp irradiation region 21c of the lower auxiliary lamp 16c is set to be forward in the travelling direction, relative to the auxiliary lamp irradiation region 21b of the intermediate auxiliary lamp 16b. For example, in a case where the vehicle body of the motorcycle 1 is further banked by a specified angle or greater, after the upper auxiliary lamp 16a is turned on, the intermediate auxiliary lamp 16b located to be lower than the upper auxiliary lamp 16a can irradiate a region which cannot be irradiated by the upper auxiliary lamp 16a, in the region which is inward with respect to the turning direction of the vehicle body. Also, in a case where the vehicle body of the motorcycle 1 is further banked by a specified angle or greater, after the intermediate auxiliary lamp 16b is turned on, the lower auxiliary lamp 16c located to be lower than the intermediate auxiliary lamp 16b can irradiate a region which cannot be irradiated by the intermediate auxiliary lamp 16b, in the region which is inward with respect to the turning direction of the vehicle body.

Figure 4:
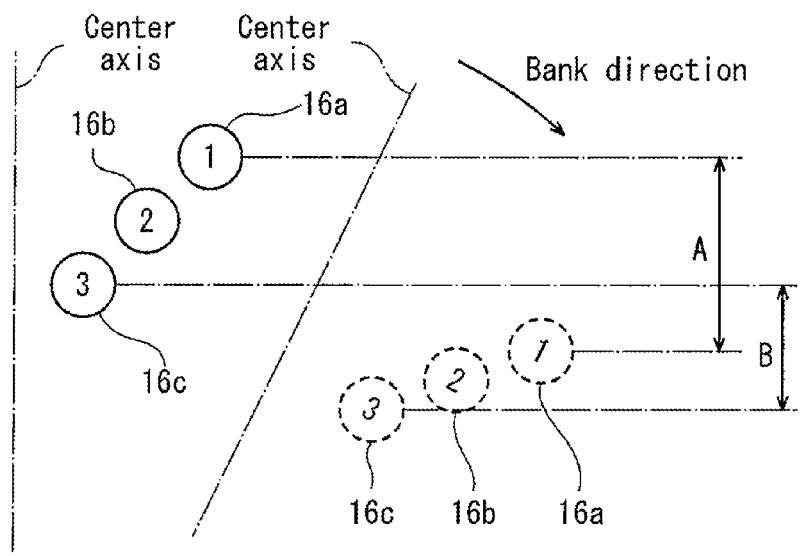
FIG. 4 is a view showing exemplary displacement states of the auxiliary lamps of FIG. 2, during turning of the motorcycle.

Relationship Between Displacement Amount of Auxiliary Lamp and Degree of Bank Angle Now, the relationship between the displacement amount of the auxiliary lamp 16 and the degree of the bank angle of the turning vehicle body of the motorcycle 1 will be described with reference to FIG. 4. FIG. 4 is a view showing exemplary displacement states of the auxiliary lamps 16 of FIG. 2, during turning of the motorcycle 1. In FIG. 4, numeric numbers within circles indicating the auxiliary lamps 16 indicate the order in which the auxiliary lamps 16 are turned on according to the degree of the bank angle of the vehicle body. The same applies to FIGS. 5-9. Referring to FIG. 2, when a distance between the upper auxiliary lamp 16a and the angular displacement center X is L1, a distance between the intermediate auxiliary lamp 16b and the angular displacement center X is L2, and a distance between the lower auxiliary lamp 16c and the angular displacement center X is L3, the distance decreases in the order of L1, L2, and L3. In brief, the distance between the auxiliary lamp 16 located on a lower side and the angular displacement center X is shorter.

In a case where the vehicle body of the motorcycle 1 is banked to the first side in the vehicle width direction, in the above-described layout of the auxiliary lamps 16, the upper auxiliary lamp 16a, the intermediate auxiliary lamp 16b, and the lower auxiliary lamp 16c are angularly displaced around the angular displacement center X, according to the bank state of the vehicle body. The displacement amount A of the upper auxiliary lamp 16a with respect to a vertical direction is greater than the displacement amount B of the lower auxiliary lamp 16c with respect to the vertical direction. In other words, as the distance between the auxiliary lamp 16 and the angular displacement center X increases, the displacement amount of the auxiliary lamp 16 which is displaced according to the degree of the bank angle of the vehicle body, increases.

Therefore, the displacement amount of the auxiliary lamp 16 (e.g., the lower auxiliary lamp 16c) which is turned on, when the degree of the bank angle of the banked vehicle body is greater, is less than that of the auxiliary lamp 16 (e.g., the upper auxiliary lamp 16a) which is turned on, when the degree of the bank angle is less. Therefore, the amount of displacement of the region irradiated by the auxiliary lamp 16, which is caused by a change in the degree of the bank angle is, for example, such that the displacement amount of the auxiliary lamp irradiation region 21c of the lower auxiliary lamp 16c is less than that of the auxiliary lamp irradiation region 21a of the upper auxiliary lamp 16a. This makes it possible to lessen a decrease in the irradiation region, in a range (specified range of the region which is inward with respect to the turning direction of the vehicle body) to which the rider's eyes are directed during turning of the motorcycle 1, the decrease occurring with an increase in the degree of the bank angle.

In a case where the vehicle body of the motorcycle 1 is banked to the second side in the vehicle width direction, the auxiliary lamps 16 placed on the second side in the vehicle width direction are turned on. The auxiliary lamps 16 are turned on in the order of the upper auxiliary lamp 16d, the intermediate auxiliary lamp 16e, and the lower auxiliary lamp 16f, according to the degree of the bank angle of the vehicle body. The configurations of the auxiliary lamps 16 placed on the second side in the vehicle width direction are the same as those of auxiliary lamps 16 placed on the first side in the vehicle width direction, and will not be described repeatedly.

When the upper auxiliary lamp 16a or the intermediate auxiliary lamp 16b is assumed as a first auxiliary lamp of the present invention, the lower auxiliary lamp 16c can be assumed as a second auxiliary lamp of the present invention. Specifically, it is assumed that n auxiliary lamps 16 are placed on the first side in the vehicle width direction. When the degree of the bank angle of the vehicle body increases in a state in which the (n−1)-th auxiliary lamp 16 ((n−1)-th indicates the order in which the auxiliary lamp 16 is turned on) is turned on, the n-th auxiliary lamp 16, the auxiliary lamp irradiation region 21 of the n-th auxiliary lamp 16 being set to be forward in the travelling direction, relative to the auxiliary lamp irradiation region 21 of the (n−1)-th auxiliary lamp 16, is turned on, to irradiate the region which is inward with respect to the turning direction of the vehicle body. In this case, a distance between the n-th auxiliary lamp 16 and the angular displacement center X is less than a distance between the (n−1)-th auxiliary lamp 16 and the angular displacement center X.

Now, the relationship between the distance between the angular displacement center X and each auxiliary lamp 16, and the displacement amount of each auxiliary lamp 16 will be described. In the present embodiment, this will be described regarding the upper auxiliary lamp 16a and the intermediate auxiliary lamp 16b. As described above, the distance between the upper auxiliary lamp 16a and the angular displacement center X is L1, the distance between the intermediate auxiliary lamp 16b and the angular displacement center X is L2, and the distance between the lower auxiliary lamp 16c and the angular displacement center X is L3.

In a case where the vehicle body of the motorcycle 1 is further banked by a specified angle (rad), in a state in which the vehicle body is banked at a specified angle θ, the displacement amount of the upper auxiliary lamp 16a in a circumferential direction is $L1 \cdot \alpha$, and the displacement amount of the intermediate auxiliary lamp 16b in the circumferential direction is $L2 \cdot \alpha$. Since the relationship of the distance L1>the distance L2 is satisfied, the amount of displacement of the intermediate auxiliary lamp 16b in the circumferential direction, which occurs with a change in the degree of the bank angle of the vehicle body, is less than that of the upper auxiliary lamp 16a. The auxiliary lamp irradiation region 21 of each auxiliary lamp 16 has an area which is proportional to the area of the light emitting surface of the auxiliary lamp 16. For this reason, when the auxiliary lamp 16 is displaced in the circumferential direction, the auxiliary lamp irradiation region 21 of the auxiliary lamp 16 is displaced by a displacement amount which is proportional to the displacement amount of the auxiliary lamp 16. Therefore, the amount of displacement of the auxiliary lamp irradiation region 21b of the intermediate auxiliary lamp 16b, which occurs with a change in the degree of the bank angle of the vehicle body, is less than that of the upper auxiliary lamp 16a.

In the motorcycle 1 of the present embodiment, when the vehicle body is further banked and the degree of the bank angle is greater, in the state in which the upper auxiliary lamp 16a is turned on, the intermediate auxiliary lamp 16b is turned on. This makes it possible to reduce the amount of circumferential displacement of the auxiliary lamp irradiation region 21 of the auxiliary lamp 16, namely, the intermediate auxiliary lamp 16b which is turned on in the state in which the degree of the bank angle is greater.

For example, when an angle formed between a straight line connecting the upper auxiliary lamp 16a to the angular displacement center X and the road surface is a placement angle β (see FIG. 2) in the motorcycle 1 in the upright state, and the vehicle body is banked at the specified angle θ, the amount of displacement of the upper auxiliary lamp 16a in the vertical direction which occurs due to the bank of the vehicle body is derived according to the following formula (1), and the amount of displacement of the upper auxiliary lamp 16a in the vehicle width direction is derived according to the following formula (2):

$$L1(\sin \beta - \sin(\beta - \theta)) \quad (1)$$

$$L1(\cos \beta - \cos(\beta - \theta)) \quad (2)$$

where sin indicates sine of a trigonometric function and cos indicates cosine of the trigonometric function. In a case where the auxiliary lamp 16 is placed in the vicinity of the head lamp 15 or above the head lamp 15, on an upper side of the vehicle body, the above-described placement angle β (0 degree≤β≤90 degrees) is greater. The amount of displacement of the auxiliary lamp 16 in the vertical direction is less according to the formula (1), as the placement angle β is greater. In view of this, by placing the auxiliary lamp 16 in a position at which the placement angle β is greater, the amount of displacement of the auxiliary lamp 16 in the vertical direction, which occurs when the vehicle body is banked, can be made less than that of the auxiliary lamp 16 in the vehicle width direction, which occurs when the vehicle body is banked. Also, by setting the placement angle β of the auxiliary lamp 16 placed on a lower side of the vehicle body to be greater than that of another auxiliary lamp 16 placed on an upper side of the vehicle body, the amount of vertical displacement of the auxiliary lamp 16 placed on the lower side can be made less than that of another auxiliary lamp 16 placed on the upper side.

In a case where the degree of the bank angle of the vehicle body is greater, for example, the motorcycle 1 is turning in a race in a circuit, the angular velocity of the bank angle may sometimes be higher than that in a case where the degree of the bank angle is less. In that case, the amount of displacement of the auxiliary lamp irradiation region 21 which occurs with an increase in the angular velocity of the bank angle, can be lessened, by setting the amount of displacement of the auxiliary lamp irradiation region 21 irradiated by the auxiliary lamp 16 to be less when the degree of the bank angle is greater.

As described above, the auxiliary lamps 16 may be placed in positions which are different from each other in distance to the angular displacement center X. As shown in FIG. 2, the size of each of the auxiliary lamps 16 is set to be smaller than that of the head lamp 15, and the auxiliary lamp irradiation region 21 of each auxiliary lamp 16 is set to be smaller than the head lamp irradiation region 20 of the head lamp 15. In this way, in the configuration in which the size of each of the auxiliary lamps 16 is set to be smaller than that of the head lamp 15, the region corresponding to the size of each of the lamps is irradiated with the light. This makes it easier to obtain a required light amount.

Further, at least one of the plurality of auxiliary lamps 16 may be configured to adjust a light amount thereof. In a case where the auxiliary irradiation mode is selected by the rider, the auxiliary lamp 16 configured to adjust the light amount may be configured to make the light amount greater when the bank angle reaches a predetermined degree than before the bank angle reaches the predetermined degree. In this way, the auxiliary lamp 16 configured to adjust the light amount can function as the auxiliary lamp 16, which is able to irradiate the region which cannot be covered by the head lamp irradiation region 20 of the head lamp 15, when the bank angle reaches the predetermined degree. On the other hand, the auxiliary lamp 16 configured to adjust the light amount can make the light amount less before the bank angle reaches the predetermined degree, and function as a position lamp.

In a case where the auxiliary irradiation mode is not selected by the rider, the auxiliary lamp 16 configured to adjust the light amount may maintain the light amount used in the position lamp, and may not change the light amount even when the vehicle body is banked.

Further, the auxiliary lamp 16 in which the distance to the angular displacement center X is shorter may be placed close to the forefront of the front cover 14a in the travelling direction. In this configuration, the auxiliary lamps 16 can be easily laid out on the front cover 14a having the stream-line shape.

In the motorcycle 1 according to Embodiment 1, the upper auxiliary lamp 16a, the intermediate auxiliary lamp 16b, and the lower auxiliary lamp 16c are turned on in this order, as the degree of the bank angle of the vehicle body increases. For example, when the lower auxiliary lamp 16c is turned on, the upper auxiliary lamp 16a and the intermediate auxiliary lamp 16b may be turned off, or may be turned on. Or, at a time point when the intermediate auxiliary lamp 16b is turned on, the lower auxiliary lamp 16c to be subsequently turned on may be turned on together with the intermediate auxiliary lamp 16b. In a case where the lower auxiliary lamp 16c is turned on together with the intermediate auxiliary lamp 16b in this way, the region which is inward with respect to the turning direction of the vehicle body can be irradiated with the light in advance before the degree of the bank angle of the vehicle body further increases.

In the motorcycle 1 according to Embodiment 1, the plurality of auxiliary lamps 16 are sequentially turned on according to the degree of the bank angle of the vehicle body of the motorcycle 1. However, in a case where the auxiliary lamp irradiation regions 21 of all of the auxiliary lamps 16 fall within a predetermined range, all of the auxiliary lamps 16 may be turned on in a state in which the head lamp 15 is turned on.

Modified Example 1

Figure 5:
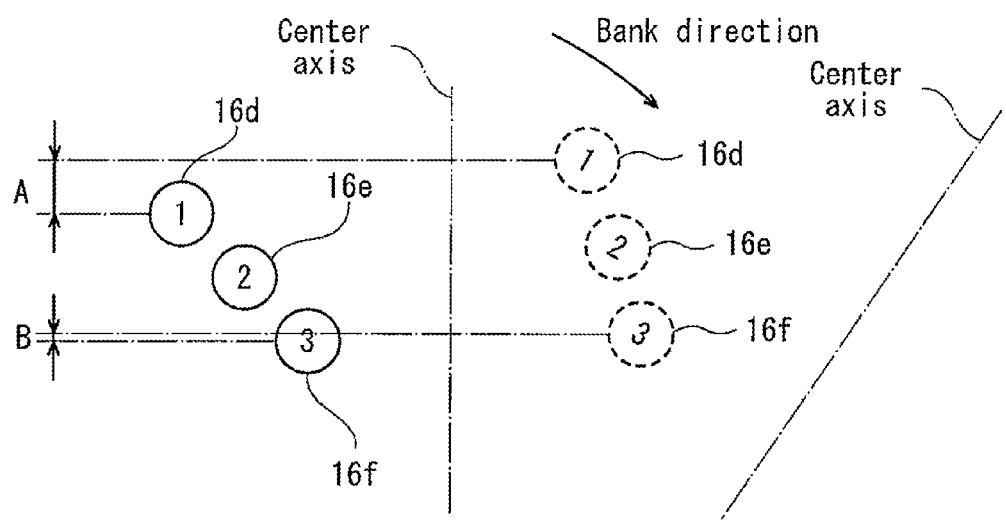
FIG. 5 is a view showing exemplary displacement states of the auxiliary lamps included in a motorcycle according to Modified Example 1 of Embodiment 1, during turning of the motorcycle.

In the motorcycle 1 according to Embodiment 1, the auxiliary lamps 16 placed on the first side in the vehicle width direction to which the vehicle body is banked are turned on during turning of the vehicle body. However, this configuration is merely exemplary. Hereinafter, the configuration of the auxiliary lamps 16 included in the motorcycle 1 according to Modified Example 1 of Embodiment 1 will be described with reference to FIG. 5. FIG. 5 is a view showing exemplary displacement states of the auxiliary lamps 16 included in the motorcycle 1 according to Modified Example 1 of Embodiment 1, during turning of the motorcycle 1. FIG. 5 schematically shows the state transition which occurs when the vehicle body of the motorcycle 1 is banked from the upright state to the angle at which the lower auxiliary lamp 16f is turned on. In FIG. 5, numeric numbers within circles indicating the auxiliary lamps 16 indicate the order in which the auxiliary lamps 16 are turned on according to the degree of the bank angle of the vehicle body.

The layout of the auxiliary lamps 16 according to Modified Example 1 of Embodiment 1 is different from that of the auxiliary lamps 16 according to Embodiment 1 in the following respect. In the motorcycle 1 according to Embodiment 1, the auxiliary lamps 16 placed on the first side in the vehicle width direction to which the vehicle body is banked are turned on during turning of the vehicle body. In contrast, in the motorcycle 1 according to Modified Example 1, the auxiliary lamps 16 placed on the second side in the vehicle width direction which is opposite to the side to which the vehicle body is banked are turned on during turning of the vehicle body. In the motorcycle 1 according to Modified Example 1, in a case where the vehicle body is banked to the first side in the vehicle width direction during turning of the vehicle body, the auxiliary lamps 16 placed on the second side in the vehicle width direction are turned on to irradiate the region which is inward with respect to the turning direction of the vehicle body.

In the state in which the vehicle body of the motorcycle 1 is banked, the height of the vehicle body in the vertical direction is shorter than that in the state in which the vehicle body is upright, and the height of the head lamp 15 and the heights of the auxiliary lamps 16 placed on the first side in the vehicle width direction to which the vehicle body is banked, are shorter than those in the state in which the vehicle body is upright. However, the auxiliary lamps 16 placed on the second side in the vehicle width direction which is opposite to the side to which the vehicle body is banked, are displaced upward as the degree of the bank angle of the vehicle body increases.

In the state in which the vehicle body is banked, all of the auxiliary lamps 16 placed on the second side in the vehicle width direction are located in the vicinity of the positions at which the placement angle β is 90 degrees. For this reason, as shown in FIG. 5, the amounts of displacement of the auxiliary lamps 16 placed on the second side in the vehicle width direction are less than those of the auxiliary lamps 16 placed on the first side in the vehicle width direction, as in the motorcycle 1 of Embodiment 1. This makes it possible to lessen a decrease in the irradiation region, in a range (specified range of the region which is inward with respect to the turning direction of the vehicle body) to which the rider's eyes are directed during turning of the motorcycle 1, the decrease occurring with an increase in the degree of the bank angle.

In a case where the degree of the bank angle increases and the height of the vehicle body in the vertical direction decreases, the front region in the travelling direction can be irradiated by the auxiliary lamp 16 placed on the second side in the vehicle width direction, from a highest possible position. Thus, the motorcycle 1 according to Modified Example 1 can increase the region to be irradiated with the light.

Now, consideration will be given to a case where the auxiliary lamps 16 placed in positions on the second side relative to a vertical line extending vertically and passing through the center position O of the head lamp 15, are angularly displaced around the angular displacement center X to positions on the first side relative to this vertical line as the degree of the bank angle increases. In this case, while the degree of the bank angle of the vehicle body is less, the auxiliary lamps 16 placed in the positions on the second side relative to the vertical line can easily perform irradiation. On the other hand, when the degree of the bank angle is greater, the auxiliary lamps 16 having being displaced to the positions on the first side relative to the vertical line can easily perform irradiation.

In a case where the degree of the bank angle increases after the upper auxiliary lamp 16a is turned on and the upper auxiliary lamp 16a remains in an on-state, in the motorcycle 1 according to Embodiment 1, the upper auxiliary lamp 16a continues to be in the on-state for a longest period of time, among the plurality of auxiliary lamps 16 placed on the first side in the vehicle width direction. As shown in FIG. 4, the displacement amount of the upper auxiliary lamp 16a in the vertical direction is greater than those of other auxiliary lamps 16 placed on the first side in the vehicle width direction. When the degree of the bank angle increases, the upper auxiliary lamp 16a intensively irradiates the region close to the vehicle body in the travelling direction, in the front region relative to the vehicle body.

On the other hand, in the motorcycle 1 according to Modified Example 1, the vertical displacement amounts of the auxiliary lamps 16 placed on the second side in the vehicle width direction can be made less than those of the auxiliary lamps 16 placed on the first side in the vehicle width direction, as in the motorcycle 1 of Embodiment 1. In addition, the vertical displacement amount of the lower auxiliary lamp 16f which is turned on last with an increase in the degree of the bank angle, can be made less than those of other auxiliary lamps (the upper auxiliary lamp 16d, the intermediate auxiliary lamp 16e) placed on the second side in the vehicle width direction. Thus, in the motorcycle 1 according to Modified Example 1, it becomes possible to lessen the displacement amount of the upper auxiliary lamp 16d which is turned on first when the vehicle body is banked, and lessen the displacement amount of the lower auxiliary lamp 16f which is turned on last with an increase in the degree of the bank angle.

Modified Example 2

Figure 6A:
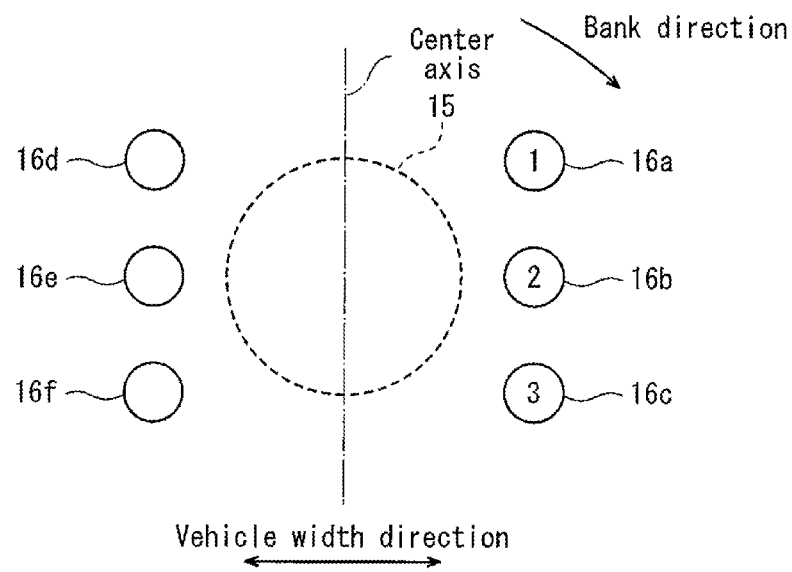
FIG. 6A is a view schematically showing an exemplary positional relationship between the head lamp and the auxiliary lamps in a motorcycle according to Modified Example 2 of Embodiment 1.
Figure 6B:
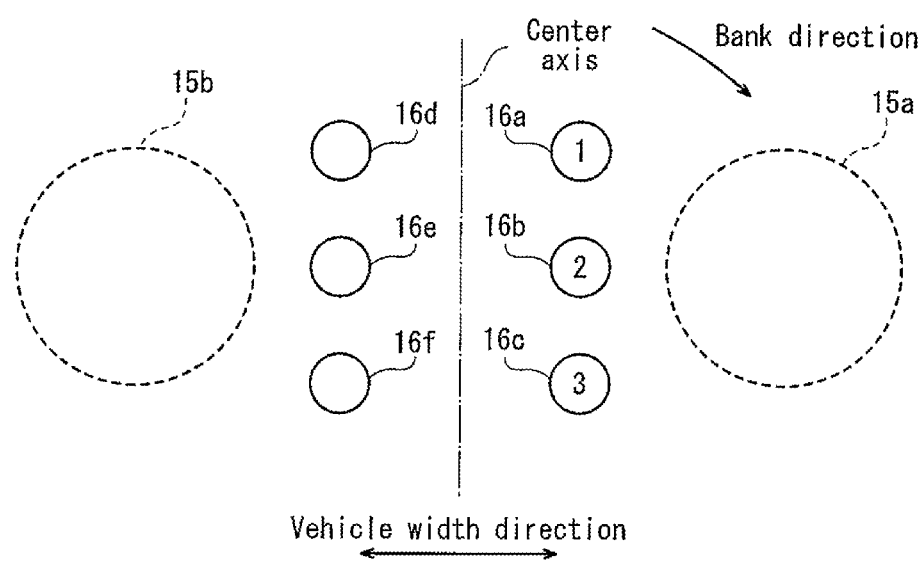
FIG. 6B is a view schematically showing an exemplary positional relationship between the head lamps and the auxiliary lamps in a motorcycle according to Modified Example 2 of Embodiment 1.

In the motorcycle 1 according to Embodiment 1, the upper auxiliary lamp 16a, the intermediate auxiliary lamp 16b, and the lower auxiliary lamp 16c placed on the first side in the vehicle width direction, and the upper auxiliary lamp 16d, the intermediate auxiliary lamp 16e, and the lower auxiliary lamp 16f placed on the second side in the vehicle width direction define a substantially-V shape. However, the layout of the auxiliary lamps 16 is not limited to this. FIGS. 6A and 6B are views each schematically showing an exemplary positional relationship between the head lamp(s) 15 and the auxiliary lamps 16 in the motorcycle 1 according to Modified Example 2 of Embodiment 1.

As shown in FIG. 6A, in the motorcycle 1 according to Modified example 2, the upper auxiliary lamp 16a, the intermediate auxiliary lamp 16b, and the lower auxiliary lamp 16c placed on the first side in the vehicle width direction may be aligned in the height direction of vehicle body, and the upper auxiliary lamp 16d, the intermediate auxiliary lamp 16e, and the lower auxiliary lamp 16f placed on the second side in the vehicle width direction may be aligned in the height direction of vehicle body.

Further, as shown in FIG. 6B, in a case where the motorcycle 1 includes two head lamps 15a, 15b, the upper auxiliary lamp 16a, the intermediate auxiliary lamp 16b, and the lower auxiliary lamp 16c placed on the first side in the vehicle width direction may be aligned in the height direction of vehicle body, between the two head lamps 15a, 15b, while the upper auxiliary lamp 16d, the intermediate auxiliary lamp 16e, and the lower auxiliary lamp 16f placed on the second side in the vehicle width direction may be aligned in the height direction of vehicle body, between the two head lamps 15a, 15b. In other words, in a case where the head lamp 15 is comprised of the two head lamps 15a, 15b, the auxiliary lamps 16 may be placed between the two head lamps 15a, 15b, in the vehicle width direction.

In the motorcycle 1 according to Modified example 2, in a case where the vehicle body is banked to the first side in the vehicle width direction and the auxiliary lamps 16 placed on the first side in the vehicle width direction are turned on, the upper auxiliary lamp 16a placed on an upper side, the intermediate auxiliary lamp 16b, and the lower auxiliary lamp 16c placed on a lower side, are turned on in this order. Also, as in Modified Example 1, in a case where the vehicle body is banked to the first side in the vehicle width direction and the auxiliary lamps 16 placed on the second side in the vehicle width direction are turned on, the upper auxiliary lamp 16d placed on an upper side, the intermediate auxiliary lamp 16e, and the lower auxiliary lamp 16f placed on a lower side, are turned on in this order.

Modified Example 3

Figure 7A:
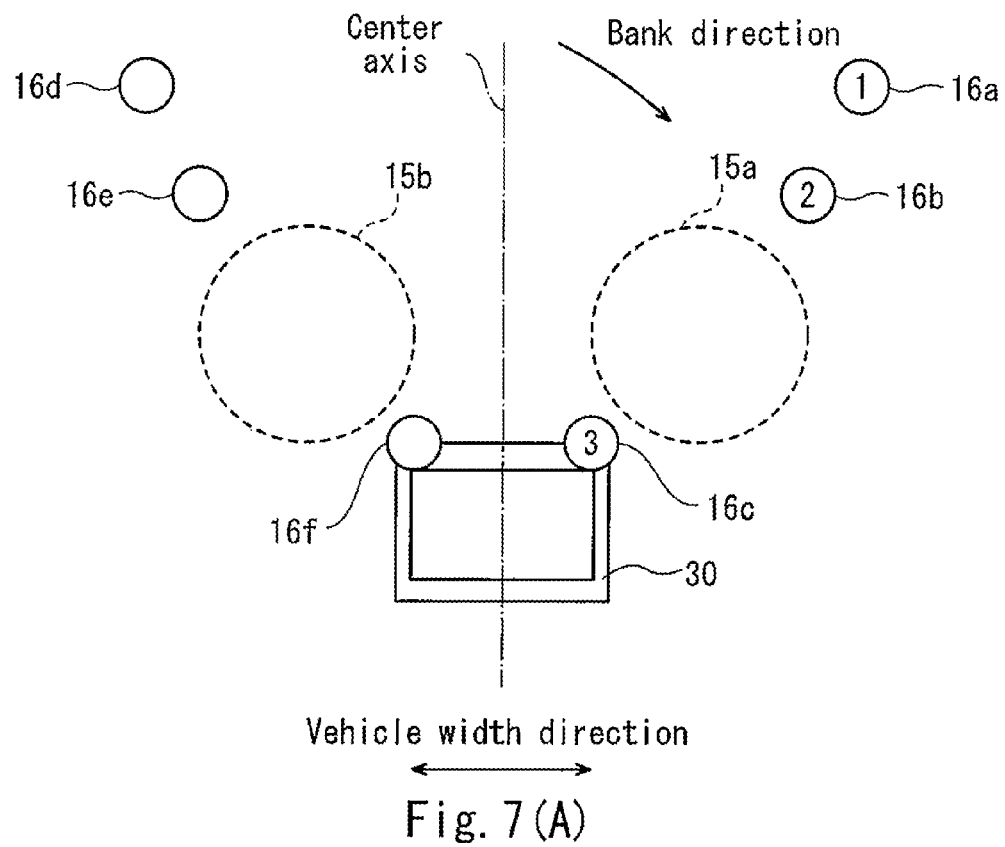
FIG. 7A is a view schematically showing an exemplary positional relationship between the head lamps and the auxiliary lamps in a motorcycle according to Modified Example 3 of Embodiment 1.

FIG. 7A is a view schematically showing an exemplary positional relationship between the head lamps 15 and the auxiliary lamps 16 in the motorcycle 1 according to Modified Example 3 of Embodiment 1. In a case where an air intake hole 30 is provided below the two head lamps 15a, 15b, as shown in FIG. 7A, one of the plurality of auxiliary lamps 16 placed on the first side in the vehicle width direction and one of the plurality of auxiliary lamps 16 placed on the second side in the vehicle width direction may be placed on the edges of the air intake hole 30. In the example of FIG. 7A, the lower auxiliary lamp 16c and the lower auxiliary lamp 16f are placed on the edges of the air intake hole 30. The air intake hole 30 serves to take in a large amount of air to be supplied to the engine by use of ram air generated during driving of the motorcycle 1.

In the motorcycle 1 according to Modified example 3, in a case where the vehicle body is banked to the first side in the vehicle width, the upper auxiliary lamp 16a placed outside of the head lamp 15a serves as the first auxiliary lamp turned on first on the first side in the vehicle with direction. Also, in a case where the vehicle body is banked until the bank angle reaches a predetermined degree, the lower auxiliary lamp 16c placed between the two head lamps 15a, 15b serves as the second auxiliary lamp turned on subsequently to the first auxiliary lamp on the first side in the vehicle width direction. In other words, on the first side in the vehicle width direction, the auxiliary lamps 16 are placed inward and outward in the vehicle width direction, respectively relative to the center position of the head lamp 15a, and the auxiliary lamp 16 placed inward in the vehicle width direction serves as the second auxiliary lamp turned on subsequently to the first auxiliary lamp, with an increase in the degree of the bank angle of the vehicle body.

Modified Example 4

Figure 7B:
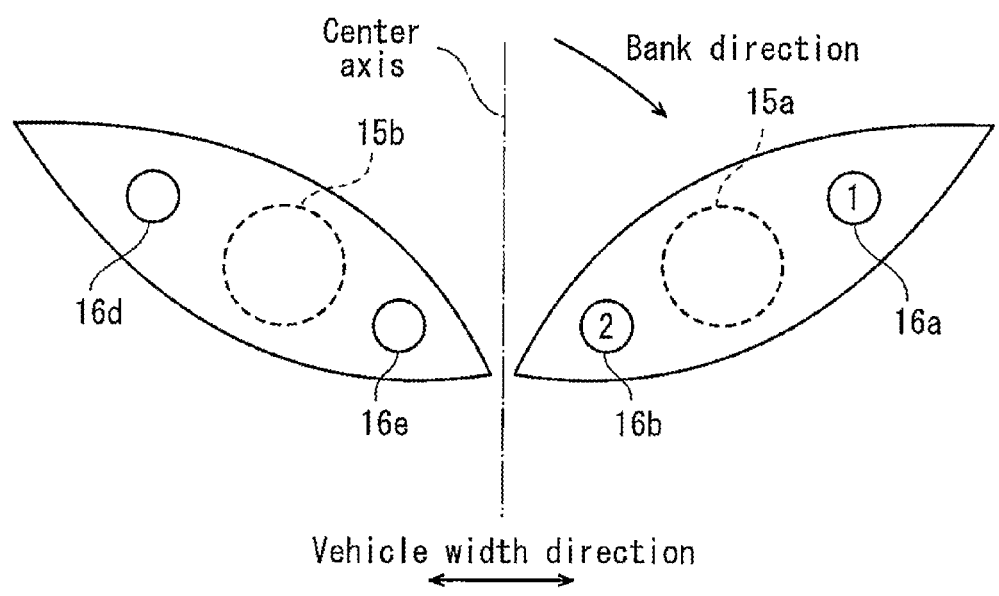
FIG. 7B is a view schematically showing an exemplary positional relationship between the head lamps and the auxiliary lamps in a motorcycle according to Modified Example 4 of Embodiment 1.

FIG. 7B is a view schematically showing an exemplary positional relationship between the head lamps 15 and the auxiliary lamps 16 in the motorcycle 1 according to Modified Example 4 of Embodiment 1. As shown in FIG. 7B, the head lamp 15a may be integrated with at least one of the auxiliary lamps 16a, 16b, 16c as a unit, while the head lamp 15b may be integrated at least one of the auxiliary lamps 16d, 16e, 16f as a unit. In the example of FIG. 7B, the head lamp 15a is integrated with the upper auxiliary lamp 16a and the intermediate auxiliary lamp 16b. In this integrated configuration, the upper auxiliary lamp 16a is located to be higher than the head lamp 15a, and the intermediate auxiliary lamp 16b is located to be lower than the head lamp 15a. The auxiliary lamp irradiation region 21b of the intermediate auxiliary lamp 16b turned subsequently to the upper auxiliary lamp 16a, with an increase in the degree of the bank angle, is set to be forward in the travelling direction, relative to the auxiliary lamp irradiation region 21a of the upper auxiliary lamp 16a, in the region which is inward with respect to the turning direction of the vehicle body. Alternatively, the lower auxiliary lamp 16c may be integrated with the head lamp 15a, or may be accommodated in the front cover 14a, although not shown in FIG. 7B.

Regarding the auxiliary lamps 16 placed on the second side in the vehicle width direction, the head lamp 15b may be integrated with the upper auxiliary lamp 16d and the intermediate auxiliary lamp 16e, as in the auxiliary lamps 16 placed on the first side in the vehicle width direction. In the configuration in which the head lamp 15 is integrated with at least one of the auxiliary lamps 16 in the above-described manner, assembling of the components can be easily carried out.

In the case where the head lamp 15 includes the two head lamps, the auxiliary lamps 16 can be laid out in various ways. Nonetheless, the head lamp 15 which is a single lamp makes it easier to ensure the space in which the auxiliary lamps 16 are placed, which can lay out the auxiliary lamps 16 more flexibly.

Further, in the motorcycle 1, for example, the upper auxiliary lamp 16a and the intermediate auxiliary lamp 16b, among the plurality of auxiliary lamps 16 placed on the first side in the vehicle width direction, may be provided in the front cover 14a, and the lower auxiliary lamp 16c may be provided in the side cover 14b or the front fork 4. Also, the plurality of auxiliary lamps 16 placed on the second side in the vehicle width direction may be placed as in the plurality of auxiliary lamps 16 placed on the first side in the vehicle width direction.

Further, for example, the intermediate auxiliary lamp 16b and the lower auxiliary lamp 16c, among the plurality of auxiliary lamps 16 placed on the first side in the vehicle width direction, may be provided in the front cover 14a, and the upper auxiliary lamp 16a may be attached to a side mirror, instead of the front cover 14a. Also, the plurality of auxiliary lamps 16 placed on the second side in the vehicle width direction may be placed as in the plurality of auxiliary lamps 16 placed on the first side in the vehicle width direction.

As described above, at least one of the auxiliary lamps 16 may be placed in a location other than the front cover 14a so long as the region which is inward with respect to the turning direction of the vehicle body can be irradiated by the auxiliary lamp 16.

Embodiment 2

In the motorcycle 1 according to Embodiment 2, when the motorcycle 1 turns in a state in which the vehicle body is banked, at least one auxiliary lamp (inner auxiliary lamp) 16 placed on the first side in the vehicle width direction and at least one auxiliary lamp (outer auxiliary lamp) 16 placed on the second side in the vehicle width direction are turned on. Hereinafter, as Embodiment 2, the motorcycle 1 configured to turn on at least one auxiliary lamp 16 placed on the first side in the vehicle width direction and at least one auxiliary lamp 16 placed on the second side in the vehicle width direction, will be described with reference to FIG. 8.

Figure 8:
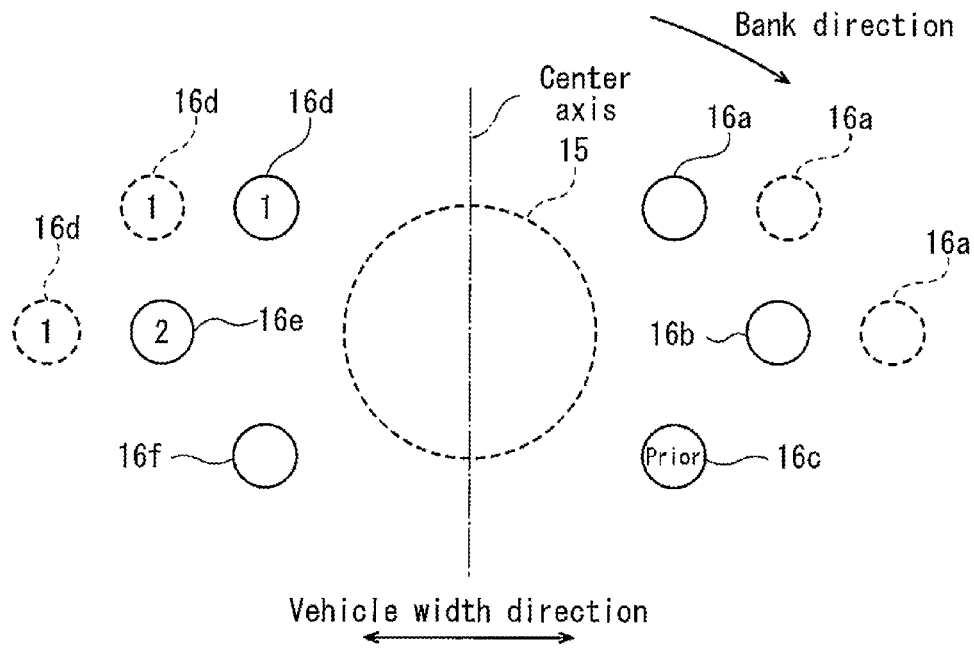
FIG. 8 is a view schematically showing an exemplary positional relationship between the head lamp and the auxiliary lamps in a motorcycle according to Embodiment 2.

FIG. 8 is a view schematically showing an exemplary positional relationship between the head lamp 15 and the auxiliary lamps 16 in the motorcycle 1 according to Embodiment 2. In FIG. 8, numeric numbers within circles indicating the auxiliary lamps 16 indicate the order in which the auxiliary lamps 16 are turned on according to the degree of the bank angle of the vehicle body. The auxiliary lamp 16 indicated by a circle containing the term "prior" is the auxiliary lamp 16 turned on first (prior irradiation auxiliary lamp), when the vehicle body starts to be banked.

In the motorcycle 1 according to Embodiment 2, the upper auxiliary lamp 16a, the intermediate auxiliary lamp 16b, and the lower auxiliary lamp 16c (prior irradiation auxiliary lamp) are placed in this order, from an upper side, on the first side in the vehicle width direction. In the upright state of the vehicle body, the upper auxiliary lamp 16a and the lower auxiliary lamp 16c (prior irradiation auxiliary lamp) are substantially aligned in the height direction. In contrast, the intermediate auxiliary lamp 16b is placed to be more distant from the center position of the vehicle body in the vehicle width direction than the upper auxiliary lamp 16a and the lower auxiliary lamp 16c (prior irradiation auxiliary lamp) are, on the first side in the vehicle width direction.

Further, as indicated by a broken-line circle of FIG. 8, the upper auxiliary lamp 16a may be located to be higher than the intermediate auxiliary lamp 16b and may be substantially aligned with the intermediate auxiliary lamp 16b in the vertical direction. Moreover, as indicated by another broken-line circle of FIG. 8, in the upright state of the vehicle body, the upper auxiliary lamp 16a may be located as high as the intermediate auxiliary lamp 16b, and more distant from the center position of the vehicle body in the vehicle width direction than the intermediate auxiliary lamp 16b is, on the first side in the vehicle width direction. On the second side in the vehicle width direction, the upper auxiliary lamp 16d, the intermediate auxiliary lamp 16e, and the lower auxiliary lamp 16f are placed to be symmetric with the upper auxiliary lamp 16a, the intermediate auxiliary lamp 16b, and the lower auxiliary lamp 16c (prior irradiation auxiliary lamp), in the above-described layout, relative to the center axis of the vehicle body.

When the motorcycle 1 turns in the state in which the vehicle body is banked to the first side in the vehicle width direction, the lower auxiliary lamp 16c (prior irradiation auxiliary lamp) placed on the first side in the vehicle width direction and on a lowermost side is turned on first. When the vehicle body is further banked and the degree of the bank angle of the vehicle body increases, the upper auxiliary lamp 16d (first auxiliary lamp) located to be symmetric with the upper auxiliary lamp 16a, relative to the center axis, is turned on. When the vehicle body is further banked and the degree of the bank angle of the vehicle body increases, the intermediate auxiliary lamp 16e (second auxiliary lamp) which is located to be symmetric with the intermediate auxiliary lamp 16b, relative to the center axis, is turned on.

The auxiliary lamp irradiation regions 21 of the lower auxiliary lamp 16c, the upper auxiliary lamp 16d, and the intermediate auxiliary lamp 16e are set to be forward in the travelling direction, relative to the head lamp irradiation region 20 of the head lamp 15. The auxiliary lamp irradiation region 21d of the upper auxiliary lamp 16d is set to be forward in the travelling direction, relative to the auxiliary lamp irradiation region 21c of the lower auxiliary lamp 16c. The auxiliary lamp irradiation region 21e of the intermediate auxiliary lamp 16e is set to be forward in the travelling direction, relative to the auxiliary lamp irradiation region 21d of the upper auxiliary lamp 16d.

As described above, in the motorcycle 1 according to Embodiment 2, in a case where the motorcycle 1 turns in the state in which the vehicle body is banked, and the degree of the bank angle is less, the lower auxiliary lamp 16c placed on the first side in the vehicle width direction and located on a lowermost side is turned on. When the degree of the bank angle of the vehicle body increases, the upper auxiliary lamp 16d and the intermediate auxiliary lamp 16e, which are placed on the second side in the vehicle width direction and located to be higher than the lower auxiliary lamp 16c turned on first, are turned on in this order.

In the above-described configuration, during turning of the vehicle body, the lower auxiliary lamp 16c initially irradiates the region which is forward in the travelling direction, relative to the head lamp irradiation region 20 of the head lamp 15. When the degree of the bank angle of the vehicle body increases, during turning of the vehicle body, the upper auxiliary lamp 16d or the intermediate auxiliary lamp 16e can irradiate a region that cannot be irradiated by the lower auxiliary lamp 16c, in the region which is inward with respect to the turning direction of the vehicle body.

The upper auxiliary lamp 16d and the intermediate auxiliary lamp 16e can irradiate the regions which are forward in the travelling direction, relative to the region irradiated by the lower auxiliary lamp 16c, from positions higher than that of the lower auxiliary lamp 16c. In a case where the degree of the bank angle of the vehicle body is less during turning of the vehicle body, the rider's eyes are directed to the front region which is close to the vehicle body. As the degree of the bank angle increases, the rider's eyes are directed to the front region which is more distant from the vehicle body than that in a case where the degree of the bank angle is less. In the motorcycle 1 according to Embodiment 2, the lower auxiliary lamp 16c, the upper auxiliary lamp 16d, and the intermediate auxiliary lamp 16e are turned on in this order, as the degree of the bank angle of the vehicle body increases. This makes it possible to irradiate the region according to shifting of the region to which the rider's eyes are directed.

Alternatively, the order in which the plurality of auxiliary lamps 16 placed on the second side in the vehicle width direction are turned on may be such that the intermediate auxiliary lamp 16e is turned on first, and the upper auxiliary lamp 16d is turned on thereafter when the degree of the bank angle increases. Specifically, as shown in FIG. 8, on the first side in the vehicle width direction, the lower auxiliary lamp 16c turned on first according to the degree of the bank angle of the vehicle body is placed as the prior irradiation auxiliary lamp, while on the second side in the vehicle width direction, the plurality of auxiliary lamps 16 turned on sequentially according to the degree of the bank angle are placed. Among the plurality of auxiliary lamps 16 placed on the second side in the vehicle with direction, the intermediate auxiliary lamp 16e located to be closer to the angular displacement center X than the upper auxiliary lamp 16d may be turned on at a timing earlier than that at which the upper auxiliary lamp 16d is turned on. In this setting, the auxiliary lamps 16 which are different in at least height position are placed on the first side and the second side of the vehicle body such that the center axis is located between these auxiliary lamps 16. Among the plurality of auxiliary lamps 16 placed on the second side in the vehicle width direction, the auxiliary lamp 16 which is more distant from the angular displacement center X is turned on as the degree of the bank angle of the vehicle body increases.

Even in the above-described configuration, in an initial stage at which the vehicle body is banked to the first side in the vehicle width direction, the lower auxiliary lamp 16c (prior irradiation auxiliary lamp) placed on the first side irradiates the region which is inward with respect to the turning direction of the vehicle body. In this way, the road surface of the front region, which is close to the vehicle body, can be easily irradiated. When the degree of the bank angle of the vehicle body increases, the upper auxiliary lamp 16d and the intermediate auxiliary lamp 16e placed on the second side in the vehicle width direction irradiate the region which is inward with respect to the turning direction of the vehicle body. Thus, the road surface can be irradiated from positions higher than that of the lower auxiliary lamp 16c. In this way, the road surface of the front region, which is distant from the vehicle body, can be easily irradiated.

Modified Example 1 of Embodiment 2

Figure 9:
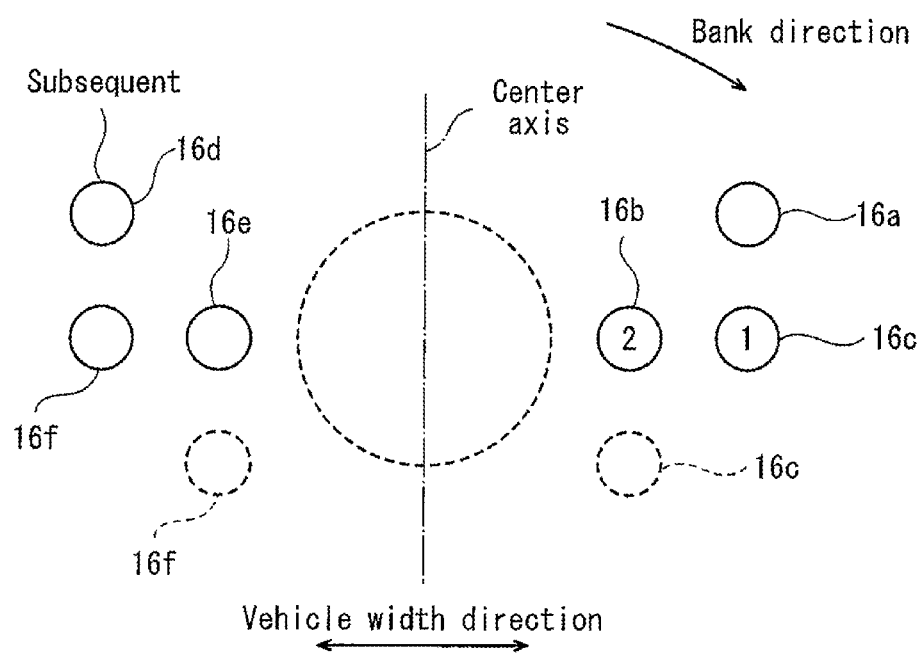
FIG. 9 is a view schematically showing an exemplary positional relationship between the head lamp and the auxiliary lamps in a motorcycle according to Modified Example 1 of Embodiment 2.

Hereinafter, the configuration of the motorcycle 1 according to Modified Example 1 of Embodiment 2 will be described with reference to FIG. 9. FIG. 9 is a view schematically showing an exemplary positional relationship between the head lamp 15 and the auxiliary lamps 16 in the motorcycle 1 according to Modified Example 1 of Embodiment 2. In FIG. 9, numeric numbers within circles indicating the auxiliary lamps 16 indicate the order in which the auxiliary lamps 16 are turned on according to the degree of the bank angle of the vehicle body. The auxiliary lamp 16 indicated by a circle provided with the term "subsequent" is the auxiliary lamp 16 turned on last (subsequent irradiation auxiliary lamp), after the vehicle body starts to be banked.

In the motorcycle 1 according to Modified Example 1 of Embodiment 2, as in the motorcycle 1 according to Embodiment 2, when the motorcycle 1 turns in the state in which the vehicle body is banked to the first side, at least one auxiliary lamp 16 (inner auxiliary lamp) placed on the first side in the vehicle width direction and at least one auxiliary lamp 16 (outer auxiliary lamp) placed on the second side in the vehicle width direction are turned on. However, the motorcycle 1 according to Modified Example 1 of Embodiment 2 is different from the motorcycle 1 according to Embodiment 2 in the layout of the auxiliary lamps 16 and the order in which the auxiliary lamps 16 are turned on.

Now, the layout of the auxiliary lamps 16 of the motorcycle 1 according to Modified Example 1 of Embodiment 2 will be described. In the motorcycle 1 according to Modified Example 1 of Embodiment 2, on the first side in the vehicle width direction, the upper auxiliary lamp 16a, the intermediate auxiliary lamp 16b, and the lower auxiliary lamp 16c are placed in this order from an upper side. The upper auxiliary lamp 16a and the lower auxiliary lamp 16c are substantially aligned in the height direction, while the intermediate auxiliary lamp 16b is substantially aligned with the lower auxiliary lamp 16c in the vehicle width direction and is located to be adjacent to the lower auxiliary lamp 16c and closer to the center position (center axis) of the vehicle body in the vehicle width direction than the lower auxiliary lamp 16c is. As indicated by a broken-line circle of FIG. 9, the lower auxiliary lamp 16c may be located to be lower than the intermediate auxiliary lamp 16b and may be substantially aligned with the intermediate auxiliary lamp 16b in the height direction. On the second side in the vehicle width direction, the upper auxiliary lamp 16d, the intermediate auxiliary lamp 16e, and the lower auxiliary lamp 16f are placed to be symmetric with the upper auxiliary lamp 16a, the intermediate auxiliary lamp 16b, and the lower auxiliary lamp 16c in the above layout, respectively, relative to the center axis in the vehicle width direction.

When the vehicle body is banked to the first side in the vehicle width direction, the lower auxiliary lamp 16c (first auxiliary lamp) placed on the first side is turned on, and then the intermediate auxiliary lamp 16b (second auxiliary lamp) placed on the first side is turned on, according to the degree of the bank angle. When the vehicle body is further banked and the degree of the bank angle of the vehicle body increases, the upper auxiliary lamp 16d (subsequent irradiation auxiliary lamp) located to be symmetric with the upper auxiliary lamp 16a, relative to the center axis, is turned on.

The auxiliary lamp irradiation regions 21 of the lower auxiliary lamp 16c, the intermediate auxiliary lamp 16b, and the upper auxiliary lamp 16d are set to be forward in the travelling direction, relative to the head lamp irradiation region 20 of the head lamp 15. The auxiliary lamp irradiation region 21b of the intermediate auxiliary lamp 16b is set to be forward in the travelling direction, relative to the auxiliary lamp irradiation region 21c of the lower auxiliary lamp 16c. The auxiliary lamp irradiation region 21d of the upper auxiliary lamp 16d is set to be forward in the travelling direction, relative to the auxiliary lamp irradiation region 21b of the intermediate auxiliary lamp 16b.

As described above, in the motorcycle 1 according to Modified Example 1 of Embodiment 2, in a case where the motorcycle 1 turns in the state in which the vehicle body is banked, and the degree of the bank angle is less, the lower auxiliary lamp 16c placed on the first side in the vehicle width direction and located on a lower side is turned on. When the degree of the bank angle of the vehicle body increases thereafter, the intermediate auxiliary lamp 16b placed on the first side is turned on. When the degree of the bank angle of the vehicle body further increases thereafter, the upper auxiliary lamp 16d which is placed on the second side in the vehicle width direction and is located to be higher than the intermediate auxiliary lamp 16b and the lower auxiliary lamp 16c which have been turned on prior to the upper auxiliary lamp 16d is turned on. Alternatively, the order in which the auxiliary lamps 16 placed on the first side in the vehicle width direction are turned on may be such that the intermediate auxiliary lamp 16b is turned on first, and the lower auxiliary lamp 16c is turned on thereafter when the degree of the bank angle increases. Specifically, as shown in FIG. 9, on the second side in the vehicle width direction, the upper auxiliary lamp 16d turned on last according to the degree of the bank angle is placed as the subsequent irradiation auxiliary lamp, while on the first side in the vehicle width direction, the plurality of auxiliary lamps 16 turned on sequentially according to the degree of the bank angle are placed. Among the plurality of auxiliary lamps 16 placed on the first side in the vehicle with direction, the intermediate auxiliary lamp 16b located to be closer to the angular displacement center X may be turned on at a timing earlier than that at which the lower auxiliary lamp 16c is turned on. In this setting, the auxiliary lamps 16 which are different in at least height position are placed on the first side and the second side of the vehicle body such that the center axis is located between these auxiliary lamps 16. Among the plurality of auxiliary lamps 16 placed on the first side in the vehicle with direction, the auxiliary lamp 16 which is more distant from the angular displacement center X is turned on as the degree of the bank angle of the vehicle body increases.

In the above-described configuration, in an initial stage at which the vehicle body is banked to the first side in the vehicle width direction, the lower auxiliary lamp 16c and the intermediate auxiliary lamp 16b which are placed on the first side irradiate the region which is inward with respect to the turning direction of the vehicle body. In this way, the road surface of the front region, which is close to the vehicle body, can be easily irradiated. When the degree of the bank angle of the vehicle body increases, the upper auxiliary lamp 16d (subsequent irradiation auxiliary lamp) placed on the second side in the vehicle width direction irradiates the region which is inward with respect to the turning direction of the vehicle body. Thus, the road surface can be irradiated from a position higher than those of the lower auxiliary lamp 16c and the intermediate auxiliary lamp 16b. In this way, the road surface of the front region, which is distant from the vehicle body, can be easily irradiated.

The present invention is effectively applicable to a straddle-type vehicle such as a motorcycle or a buggy including an auxiliary lamp in addition to a head lamp.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A straddle-type vehicle which turns in a state in which a vehicle body is banked from an upright state to a first side in a vehicle width direction around a predetermined angular displacement center, the straddle-type vehicle comprising:
   a head lamp which irradiates a head lamp irradiation region set to be forward in a travelling direction of the vehicle relative to the vehicle body;
   a first auxiliary lamp which irradiates a first auxiliary lamp irradiation region set to be forward in the travelling direction of the vehicle relative to the head lamp irradiation region, in a region which is inward with respect to a turning direction in which the vehicle body turns; and
   a second auxiliary lamp which irradiates a second auxiliary lamp irradiation region set to be forward in the travelling direction of the vehicle relative to the first auxiliary lamp irradiation region, in the region which is inward with respect to the turning direction of the vehicle body,
   wherein the second auxiliary lamp is placed in such a manner that a distance between the second auxiliary lamp and the predetermined angular displacement center is less than a distance between the first auxiliary lamp and the predetermined angular displacement center.

2. The straddle-type vehicle according to claim 1, wherein the auxiliary lamp irradiation region irradiated by at least one of the first auxiliary lamp and the second auxiliary lamp which are placed in positions on the first side in the vehicle width direction is set in a position on the first side in the vehicle width direction relative to a portion of the head lamp irradiation region, the portion corresponding to a center position of the vehicle body in the vehicle width direction.

3. The straddle-type vehicle according to claim 1, wherein each of the first auxiliary lamp and the second auxiliary lamp includes a light-emitting diode light source.

4. The straddle-type vehicle according to claim 1, wherein one of the first auxiliary lamp and the second auxiliary lamp, which is located on a lower side, is placed to be lower than a center position of the head lamp.

5. The straddle-type vehicle according to claim 1, wherein at least one of the first auxiliary lamp and the second auxiliary lamp is configured to adjust a light amount thereof, and
   wherein the at least one of the first auxiliary lamp and the second auxiliary lamp is configured to adjust the light amount in such a manner that the light amount is greater after a bank angle of the vehicle body has reached a predetermined degree than before the bank angle reaches the predetermined degree.

6. The straddle-type vehicle according to claim 1, wherein the first auxiliary lamp and the second auxiliary lamp are placed in positions on a second side in the vehicle width direction, relative to a center position of the vehicle body in the vehicle width direction, and the first auxiliary lamp irradiation region and the second auxiliary lamp irradiation region are set to be forward in the travelling direction of the vehicle, relative to the head lamp irradiation region and are set in positions on the first side in the vehicle width direction relative to a portion of the head lamp irradiation region, the portion corresponding to the center position of the vehicle body in the vehicle width direction, the straddle-type vehicle further comprising:
   a prior irradiation auxiliary lamp which is turned on and irradiates a region which is forward in the travelling direction of the vehicle, relative to the head lamp irradiation region, before the first auxiliary lamp and the second auxiliary lamp are turned on, during turning of the vehicle body,
   wherein the prior irradiation auxiliary lamp is placed in a position on the first side in the vehicle width direction relative to a center position of the vehicle body in the vehicle width direction, and
   wherein the auxiliary lamp irradiation region of the prior irradiation auxiliary lamp is set to be rearward in the travelling direction of the vehicle, relative to the first auxiliary lamp irradiation region and the second auxiliary lamp irradiation region, in the region which is inward with respect to the turning direction of the vehicle body.

7. The straddle-type vehicle according to claim 1, wherein the first auxiliary lamp and the second auxiliary lamp are placed in positions on the first side in the vehicle width direction, relative to a center position of the vehicle body in the vehicle width direction, and the first auxiliary lamp irradiation region and the second auxiliary lamp irradiation region are set to be forward in the travelling direction of the vehicle, relative to the head lamp irradiation region and are set in positions on the first side in the vehicle width direction relative to a portion of the head lamp irradiation region, the portion corresponding to the center position of the vehicle body in the vehicle width direction, the straddle-type vehicle further comprising:
   a subsequent irradiation auxiliary lamp which is turned on and irradiates a region which is forward in the travelling direction of the vehicle, relative to the head lamp irradiation region, after the first auxiliary lamp and the second auxiliary lamp are turned on, during turning of the vehicle body, wherein the subsequent irradiation auxiliary lamp is placed in a position on a second side in the vehicle width direction relative to a center position of the vehicle body in the vehicle width direction, and wherein the auxiliary lamp irradiation region of the subsequent irradiation auxiliary lamp is set to be forward in the travelling direction of the vehicle, relative to the first auxiliary lamp irradiation region and the second auxiliary lamp irradiation region, in the region which is inward with respect to the turning direction of the vehicle body.

8. A straddle-type vehicle which turns in a state in which a vehicle body is banked from an upright state to a first side in a vehicle width direction around a predetermined angular displacement center, the straddle-type vehicle comprising:

a head lamp which irradiates a head lamp irradiation region set to be forward in a travelling direction of the vehicle, relative to the vehicle body;

an inner auxiliary lamp which irradiates an inner auxiliary lamp irradiation region in a region which is inward with respect to a turning direction in which the vehicle body turns, the inner auxiliary lamp irradiation region being set in a position on the first side in the vehicle width direction relative to a portion of the head lamp irradiation region, the portion corresponding to a center position of the vehicle body in the vehicle width direction, the inner auxiliary lamp irradiation region being set to be forward in the travelling direction of the vehicle, relative to the head lamp irradiation region, the inner auxiliary lamp being placed in a position on the first side in the vehicle width direction relative to the center position of the vehicle body in the vehicle width direction; and an outer auxiliary lamp which irradiates an outer auxiliary lamp irradiation region set to be forward in the travelling direction of the vehicle, relative to the inner auxiliary lamp irradiation region, in the region which is inward with respect to the turning direction of the vehicle body, the outer auxiliary lamp being placed in a position on a second side in the vehicle width direction relative to the center position of the vehicle body in the vehicle width direction.

* * * * *